Feb. 4, 1964 — G. C. ENSLEY — 3,120,358
CABLE REEL JACK
Filed Feb. 23, 1962 — 2 Sheets-Sheet 1
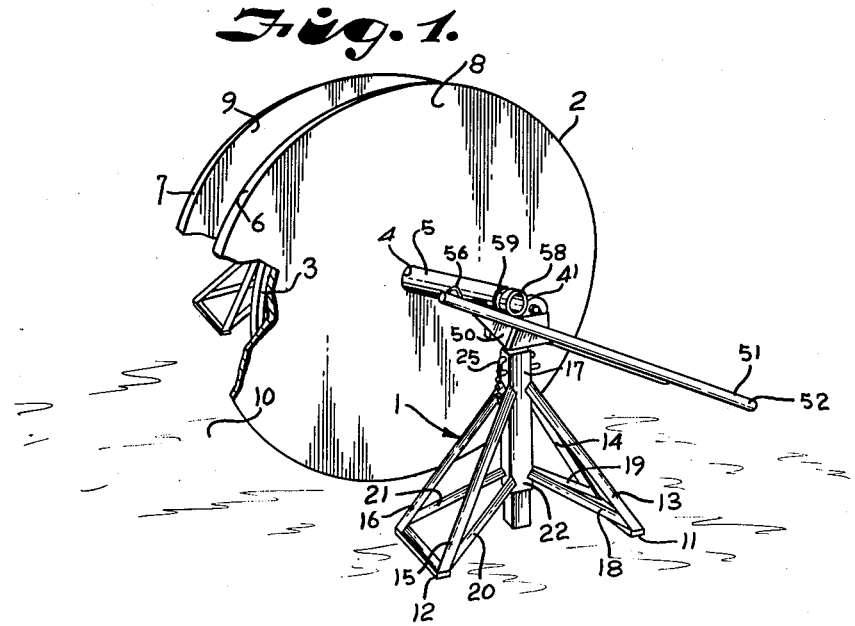
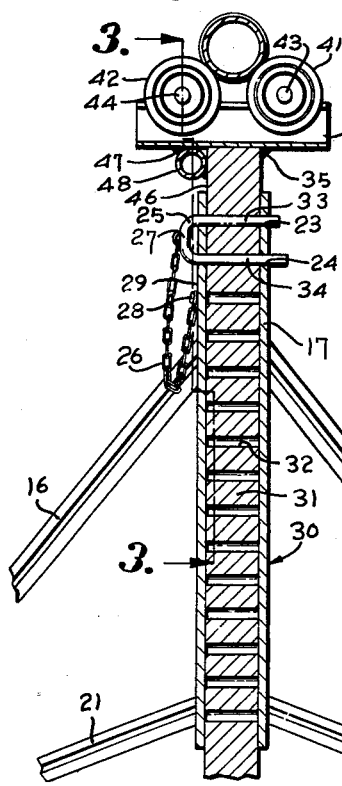
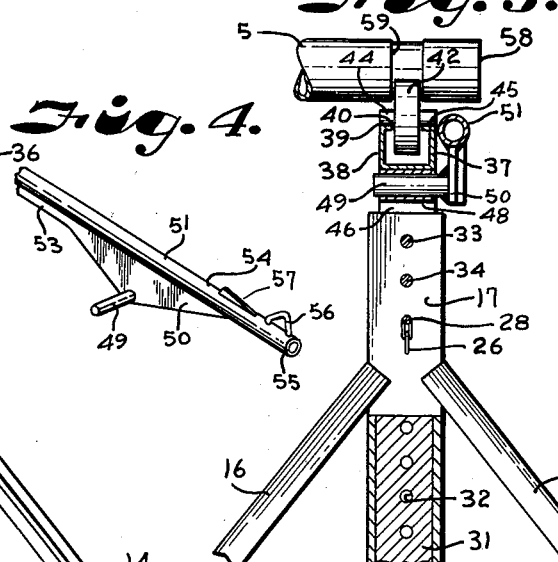
INVENTOR.
GLOVER C. ENSLEY
BY
ATTORNEYS

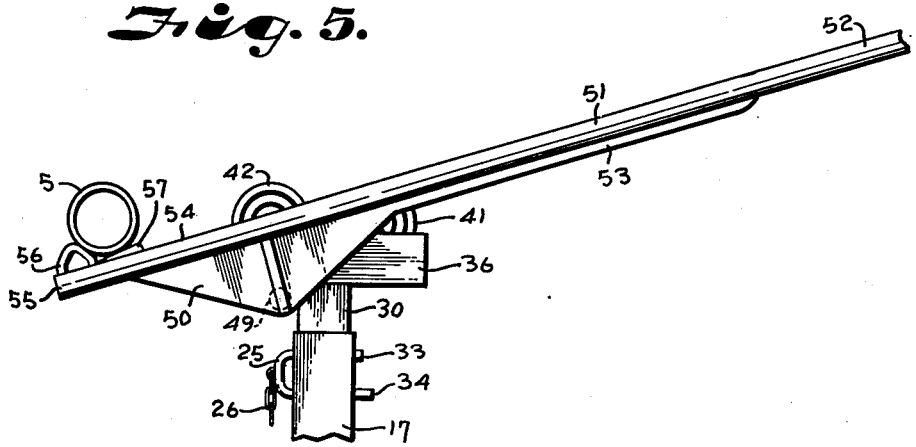
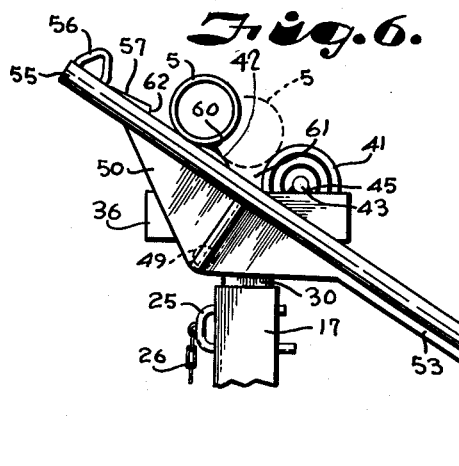
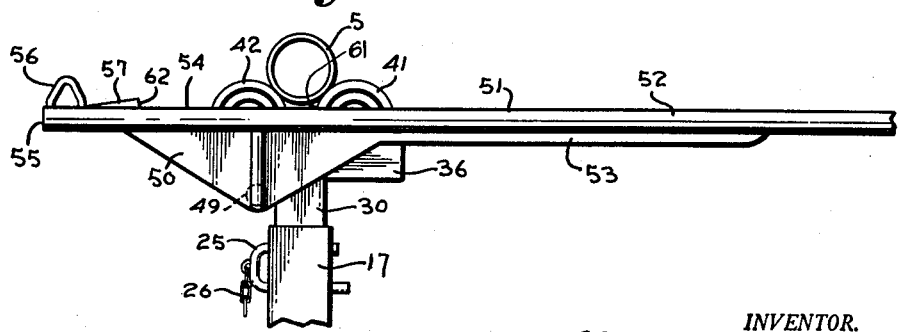

United States Patent Office 3,120,358
Patented Feb. 4, 1964

3,120,358
CABLE REEL JACK
Glover C. Ensley, 525 N. Woodland Drive,
North Kansas City, Mo.
Filed Feb. 23, 1962, Ser. No. 175,081
5 Claims. (Cl. 242—129.6)

This invention relates to jacks, and more particularly to jacks for supporting reels or drums upon which is wound a length of cable so that the jacks will support the reel above a floor for unwinding of the cable therefrom.

In accomplishing this purpose I provide standards for supporting the reel or drum free of the floor or supporting structure, a standard being on each side of the reel. These reels or drums have an opening through the center thereof for receiving a pole or shaft member here shown to be of tubular formation, the respective ends of which are engaged by the standard of the jacks to support the reel during unwinding of the cable thereon. The jacks may also be utilized for supporting the drums for winding cable thereon.

The principal object of the present invention is to provide an extensible member on the jack having a head or box on the upper end of the extensible member for supporting sealed roller bearings spaced apart so that their peripheries will form a seat for receiving an end of the pole through the drum so that the pole will rotate easily on the roller bearings when unwinding the cable from the reel or drum and prevent the pole in ordinary usage from being pulled therefrom.

Other objects of the invention are to provide a jack having a base structure which will prevent tipping of the jack; to provide means for adjustably extending the extensible member of the jack; to provide a bearing on the extensible member below said head for receiving a short shaft extending laterally from a lever or rod having at least one stop member on one end of the rod or lever for engaging the pole in the reel to raise the pole and reel so that the end of the pole will roll or slide down the rod over one of the roller bearings and be engaged between the two roller bearings and rotatably held therebetween, the shaft or rod on the lever being located on a bracket or gusset depending from the lever so as to provide leverage for raising the reel to position and to provide a device of this character simple and economical to manufacture.

Other objects and advantages of this invention will become apparent from the following description taken in connection with the company drawings wherein are set forth by way of illustration and example certain embodiments of this invention.

FIG. 1 is a perspective view partially in fragmentary showing a jack embodying my invention on each end of a cable reel and supporting the same.

FIG. 2 is an enlarged vertical cross-sectional view particularly illustrating the extensible member with the adjusting holes therein for adjusting the height of the jack.

FIG. 3 is an enlarged cross-sectional partially fragmentary view taken on a line 3—3, FIG. 2.

FIG. 4 is a perspective view of the lifting lever.

FIG. 5 is an enlarged partly fragmentary end view of the jack with the lifting lever engaging the pole of the reel.

FIG. 6 is a view similar to FIG. 5 with the reel partly raised and the pole moving down the lever.

FIG. 7 is a view similar to FIGS. 5 and 6 after the pole of the reel has come to rest in the seat formed by the roller bearings.

Referring more in detail to the drawings:

1 designates a jack embodying the features of my invention adapted for raising a reel or drum 2 upon which is wound a cable 3 having a transverse opening 4 through the center thereof for receiving a pole or the like 5 here shown to be of tubular formation.

The purpose of my jack is to raise the reel so that the edges 6 and 7 of the sides 8 and 9 will be free of the floor or supporting surface 10 so that the reel may be rotated and cable 3 unwound therefrom or wound thereon. I preferably use a jack embodying my invention on each side of the reel 2 as illustrated in FIG. 1.

The jack proper comprises a base consisting of feet 11 and 12 spaced from each other and having outer and upper legs 13 and 14 and 15 and 16 respectively having their upper ends rigidly secured by welding or other suitable means to a vertically extending tubular member 17. Brace members 18 and 19 and 20 and 21 also engage the feet 11 and 12 at their outer ends and their free ends are rigidly secured by welding or other suitable means to the lower portion 22 of the vertical tubular member 17. The upper end of the tubular member 17 is provided with spaced openings 23 and 24 for receiving a U-shape pin member 25 having a chain 26 secured to the arm 27 of the pin member and its other end secured by a rivet or the like 28 to the side 29 of the tubular member as illustrated in FIG. 2 so as to have the pin available and within easy reach for adjustment of an extensible member 30 now to be described.

The extensible member consists of a bar or ram 31 having a plurality of openings 32 spaced equi-distant apart for receiving the legs 33 and 34 of the U-shaped pin member 25. The purpose of the openings is to adjust the ram in the vertical tubular member 17 to regulate the height of the jack with respect to the reel. Rigidly mounted on the top of the extensible member 30 by welding as indicated at 35 is a head or box 36 comprising side walls 37 and 38. The top 39 of the box is provided with an elongated slot 40 and mounted therein in spaced relation are roller bearings 41 and 42 with the shafts 43 and 44 rigidly mounted by welding as indicated at 45 to the upper edge of the top of the box as illustrated in FIGS. 3 and 6.

Secured to the side 46 of the extensible member 30 by welding or other suitable means as indicated at 47 is a tubular member 48 forming a bearing for a shaft or rod 49 rigidly mounted on, and extending transversely of a gusset or bracket member 50 of a lever 51. The bracket 50 is located nearer one end of the lever 51 as particularly illustrated in FIGS. 5, 6 and 7 so that the handle portion 52 will have more leverage for raising the reel as later shown. The bracket is substantially V-shaped and has a rib 53 extending along the underneath side of the lever to all rigidity and strength thereto to prevent bending.

Rigidly secured to the upper side 54 near the end 55 of the lever 51 are spaced stop members 56 and 57, the member 56 being in the form of a loop and of greater height than the stop 57 which is a substantially flat triangularly-shaped member welded to the top of the lever.

In using a device constructed and assembled as described the pole 5 is inserted through the opening 4 in the reel 2 and the jacks are placed on each side thereof near the ends 58 of the pole. The extensible member is then adjusted by the pin member 25 inserted in a pair of the openings 32 in the standard 31 and the openings 23 and 24 in the tubular member 17 so that the height of the roller bearings 41 and 42 are slightly above the height of the pole 5 as particularly illustrated in FIG. 5. The shaft 49 on the bracket 50 of the lever 51 is inserted in the tubular bearing 48 on the extensible member 30 and the end 58 of the pole engages against the stop member 56 as illustrated in FIG. 5. It will be noted that located near the end 58 of the pole 5 is an annular groove 59 slightly wider than the width of the roller bearings 41 and 42 as illustrated in FIG. 3. Downward pressure on the handle portion 52 of the lever 51 will raise the reel along with the pole 5 and when the handle portion of the lever is lower than the end 55 the pole will roll or slide down the lever as shown in FIG. 6 so that it will engage the top of the roller 42 as indicated at 60 (FIG. 6) and roll on into the space 61 provided between the roller bearings 41 and 42 as illustrated in FIG. 7. The handle may then be raised and the shaft 49 disengaged from the bearing 48 so that it may be moved to the other side of the reel and the same procedure followed to raise the other end of the pole to the jack on that side to free the reel from the floor 10 so that it may rotate to unwind the cable 3 therefrom. It will be obvious the jacks will be set in opposite position so that the tubular bearing member 48 will be on opposite sides of the pole 5. To remove the reel from the jacks the lever is operated in the opposite direction. With the roller bearing arrangement the feet of the jack may be on uneven ground and the bearings still form a seat for the end of the pole.

The roller bearings are sealed and are spaced a distance apart so that the rotation of the pole will rotate the bearings and yet will not permit movement of the pole from between the bearings without raising the same by mechanical means. In other words, it will not roll off the seat in ordinary usage. The jacks are lightweight and are capable of raising up to approximately 2 tons each and are adjustable in height from 20 to 33 inches although I do not wish to be limited to any particular strength or size of the jacks.

For heavy loads, the stop 57 may be utilized for shorter leverages and less pressure on the handle 52 to raise heavy loads. In this instance the pole 5 will engage against the face 62 of the stop member and be retained thereagainst until the lever passes center so that the pole will slide along the tops thereof as previously described.

It will be obvious from the foregoing that I have provided an improved jack for the raising of reels containing cable or the like which may be quickly adjusted and the cable supported therefrom by a single user.

It will be obvious that in placing the jack alongside the end of the pole it should align with the groove 59 and spaced slightly to one side thereof as illustrated in FIGS. 3 and 5. The groove prevents the pole from transverse movement with respect to the rollers.

It is to be understood that while I have illustrated and described one form of my invention it is not to be limited to this specific form or arrangement of parts herein described and shown except insofar as such limitations are included in the claims.

What I claim and desire to secure by Letters Patent is:

1. A lifting jack for a cable reel having a pole with ends extending outwardly of said reel comprising,
    (a) a supporting member terminating at the upper end thereof in a pole end receiving member having a depressed seat for preventing lateral shifting of said pole end,
    (b) a tubular bearing member rigidly secured to the supporting member,
    (c) a lever having a handle portion,
    (d) a shaft on said lever intermediate the ends thereof for engaging in the tubular bearing member,
    (e) and a stop member on one end of said lever, whereby the end of said pole may be engaged by said lever adjacent said stop member and downward pressure on the handle portion will raise the end of said pole and said cable reel and allow said end of the pole to move along said lever and engage in said seat.

2. A lifting jack for a cable reel having a pole with ends extending outwardly of said reel comprising, an upright extensible member,
    (a) a box rigidly mounted on top of said extensible member,
    (b) spaced roller bearings rigidly secured in and having their peripheries extending above said box, the facing peripheries thereof forming a seat for the ends of said pole,
    (c) a bearing member rigidly secured to the extensible member and the underneath side of said box,
    (d) a lever having a handle portion,
    (e) means on said lever nearer one end portion than the center thereof for engaging in the bearing member,
    (f) and a stop member on one end of said lever member, whereby the end of said pole may be engaged by said lever adjacent said stop member and downward pressure on the handle portion will raise the end of said pole and said cable reel and allow said end of the pole to move along said lever and engage in said seat formed by said roller bearings.

3. A lifting jack for a cable reel having a pole with ends extending outwardly of said reel comprising, an upright supporting member,
    (a) a box having an open top and spaced side edges rigidly secured to the top of said supporting member,
    (b) spaced roller bearings in said box having shafts rigidly secured to the upper side edges of said box, the facing peripheries thereof forming a seat for the ends of said pole,
    (c) a tubular bearing member rigidly secured to the supporting member and the underneath side of said box,
    (d) a lever having a handle portion,
    (e) a shaft on said lever nearer one end portion than the center thereof for engaging in the tubular bearing member,
    (f) and a stop member on one end of said lever member, whereby the end of said pole may be engaged by said lever adjacent said stop member and downward pressure on the handle portion will raise the end of said pole and said cable reel and allow said end of the pole to move along said lever and engage in said seat formed by said roller bearings.

4. A lifting jack for a cable reel having a pole with ends extending outwardly of said reel comprising,
    (a) a base having a vertically extending tubular member,
    (b) an extensible member slidable in said tubular member,
    (c) a box rigidly secured on top of said extensible member,
    (d) spaced roller bearings in said box, the facing peripheries thereof forming a seat for the ends of said pole,
    (e) a tubular bearing member rigidly secured to the extensible member and the underneath side of said box,
    (f) a lever having a handle position,
    (g) a shaft on said lever nearer one end portion than the center thereof for engaging in the tubular bearing member,
    (h) and a stop member on one end of said lever member, whereby the end of said pole may be engaged by said lever adjacent said stop member and downward pressure on the handle portion will raise the end of said pole and said cable reel and allow said end of the pole to move along said lever and engage in said seat formed by said roller bearings.

5. The apparatus of claim 4 including means engaging said vertically extending tubular member and said extensible member for holding said member in vertically adjusted position.

References Cited in the file of this patent

UNITED STATES PATENTS

| | | | |
|---|---|---|---|
| 527,879 | Potter | Oct. 23, | 1894 |
| 1,629,644 | Speirs | May 24, | 1927 |
| 1,747,289 | Cornell et al. | Feb. 18, | 1930 |
| 2,570,941 | Grigsby | Oct. 9, | 1951 |
| 2,601,960 | Hick | July 1, | 1952 |